UNITED STATES PATENT OFFICE.

F. J. CARRALL, OF MILLVILLE, NEW JERSEY.

IMPROVED MEDICINE.

Specification forming part of Letters Patent No. 53,946, dated April 17, 1866.

*To all whom it may concern:*

Be it known that I, FRANCIS J. CARRALL, of Millville, Cumberland county, New Jersey, have invented an Improved Medicine for the Cure of Dyspepsia; and I do hereby declare the following to be a full, clear, and exact description of the manner of preparing the same.

To one pint of a strong decoction of the roots of the spruce-pine I add one pint of a decoction of the roots of the red cedar and boil the two for three hours, after which I add one pint of a decoction prepared from the roots of the hoarhound, and then boil the whole for one hour. One pint of pine-tar and one pint of molasses are then added. The boiling is continued for fifteen minutes longer, when, after the addition of one pint of essence of lemon or other flavoring-extract, the preparation will be ready for use.

The medicine is administered in doses of a tea-spoonful, one dose being given about ten minutes before each meal.

I have found by many practical experiments that when prepared and used as above described the medicine produces a most beneficial effect.

Although I prefer to use the ingredients composing the preparation in equal quantities, as described, they may be combined in various proportions. In some instances, also, other substances may be substituted for the molasses, hoarhound, and tar.

I claim as my invention and desire to secure by Letters Patent—

A medicine for the cure of dyspepsia consisting of decoctions of the roots of spruce-pine and red cedar, in combination with the within-described ingredients or their equivalents, the whole being compounded substantially in the manner described.

In testimony whereof I have signed my name to this specification in the presence of two subscribing witnesses.

F. J. CARRALL.

Witnesses:
CHAS. B. PRICE,
JOHN WHITE.